US006675143B1

United States Patent
Barnes et al.

(10) Patent No.: US 6,675,143 B1
(45) Date of Patent: Jan. 6, 2004

(54) AUTOMATIC LANGUAGE IDENTIFICATION (75) Inventors: David Laurence Barnes, Austin, TX (US); John Brian Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 09/703,000

(22) Filed: Nov. 1, 2000

(30) Foreign Application Priority Data

Nov. 23, 1999 (GB) ............................................. 9927528

(51) Int. Cl.$^7$ .............................................. G10L 15/00

(52) U.S. Cl. ...................................... 704/257; 704/251

(58) Field of Search ................................ 704/231, 235, 704/251, 257, 270, 209, 207

(56) References Cited

U.S. PATENT DOCUMENTS 4,817,155 A * 3/1989 Briar et al. ................. 704/246
5,636,325 A * 6/1997 Farrett ........................ 704/258
5,675,705 A * 10/1997 Singhal ....................... 704/254

OTHER PUBLICATIONS

Hutchins et al. :on using prosodic cues in autmatic language identification IEEE 10, 1996, pp 1768–1771.*

Bruin et al. "automatic language recognition based on discrimanting features in pitch contours" IEEE 1993 pp133–138.*

Sugiama "automatic language recognition using acoustic features" IEEE 1991 pp 813–816.*

Goodman et al. "improved automatic language identification in noisy speech" 1989 IEEE pp 528–531.*

* cited by examiner

Primary Examiner—Daniel Abebe
(74) Attorney, Agent, or Firm—J. Bruce Schelkopf (57) ABSTRACT

Extraction of articulatory factors from an acoustic signal to distinguish between different languages and further identify the original accent of a foreign speaker. Previous language identification systems require identification of the individual phonemes which is not ideal for interactive voice response systems which do not have speech recognition capability. A method of determining a language set for use in an interactive voice response system including the steps of providing a plurality of samples from a voice signal, calculating a first and second format frequency for each sample, calculating a first factor based on the average first and second format frequency for the plurality of samples, finding a nearest matching reference to the first factor, and selecting a corresponding language set to the nearest matching reference.

11 Claims, 6 Drawing Sheets

1. voice in
2. LPC calculates polynomial for voice pattern
3. centre formant frequencies extracted
4. average formants calculated
5. average formants normalised
6. average dispersion calculated
7. language correlation
8. language output
9. dialogue manager selects language prompt set

AUTOMATIC LANGUAGE IDENTIFICATION

TECHNICAL FIELD

This invention relates to identification of the language of a speaker using a voice system. In particular, it relates to extraction of articulatory factors from an acoustic signal to distinguish between different languages and further identify the original accent of a foreign speaker.

BACKGROUND INFORMATION

In a multilingual environment, IVR (interactive voice response) services need to enter into an initial negotiation with the caller to establish which language should be used for outgoing prompts. To provide switching of this kind automatically would be an advantage. One current method requires the caller to say a key word which may be recognized directly out of a multilingual recognition vocabulary or have the incoming speech presented to several language specific models and use response time and confidence value to determine the language used. Calling line identification (CLID) is used for previously identified telephone lines, but if a different caller uses the telephone line, it will not provide complete robustness. Another method is to request, via DTMF selection, that the caller make an explicit choice.

One language recognition method uses phoneme analysis on whole utterances. U.S. Pat. No. 5,636,325, assigned to IBM Corporation, discloses a system for speech synthesis and analysis of dialects. A set of intonation intervals, for a chosen dialect are applied to the intonational contour of a phoneme string derived from a single set of stored linguistic units, e.g., phonemes. Sets of intonational interval are stored to simulate or recognize different dialects or languages from a single set of stored phonemes. The interval rules preferably use a prosodic analysis of the phoneme string or other cues to apply to a given interval to the phoneme string. A second set of interval data is provided for semantic information. The speech system is based on the observation that each dialect and language possess its own set of musical relationships or intonation intervals. These musical relationships are used by a human listener to identify the particular dialect or language. The speech system may be either a speech synthesis or speech analysis tool or may be a combined speech synthesis/analysis system.

Another known language recognition method uses phonetic analysis of vowel sounds. U.S. Pat. No. 5,689,616 discloses a language identification and verification system whereby language is determined by finding the closest match of a speech utterance to multiple speaker sets. It is implemented using speaker baseline references in a plurality of languages and comparing unknown speech input with the references to find the closest fit. The system uses phonetic speech features derived from vocalic or syllabic nuclei using Hidden Markov Model analysis and comparing with stored phonetic references.

The segment based and syllabic nuclei approaches require segment identification of the individual phonemes, but these approaches are not ideal for applications where there is no speech recognition capability. IVR services which do not support speech recognition, do not have the resources to perform phoneme recognition, and there is a need to perform language identification with less of a resource requirement.

SUMMARY OF THE INVENTION

In one aspect of the invention there is provided a method of determining a language set for use in an interactive voice response system comprising the steps of providing a plurality of samples from a voice signal, calculating a non-phonetic characteristic of each sample, and selecting a corresponding language set based on the non-phonetic characteristic.

In one embodiment, the non-phonetic characteristic is based on a first and second formant frequency for each sample. In another embodiment, it may be based on the fundamental frequency contour. In another embodiment, the duration of voicing, and in another embodiment the bandwidth characteristics in the spectral sections.

In an embodiment, the non-phonetic characteristic is based on the average first and second format frequency for the plurality of samples. In this, way a determination of the language category can be made without phonetic analysis and the resources associated with it.

Advantageously, there is provided a further step of calculating the displacement of each sample from the averaged first and second format frequency and calculating a second factor based on the average displacement of the samples, wherein the nearest matching reference is compared against the first and second factors. The formants are normalized to a theoretical ratio of 3F1=F2. The second format frequency is a weighted combination of the second and further format frequencies.

The first and second formants are only acquired for fully voiced samples where the fundamental frequency is not substantially zero.

The foregoing has outlined rather broadly the features and technical advantages of the present intention in order that the detailed description of the invention that follows may be better understood. Additional features and advantages of the invention will be described hereinafter which form the subject of the claims of the invention.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention may be practiced without such specific details. In other instances, well-known circuits have been shown in block diagram form in order not to boscure the present invention in unnecessary detail. For the most part, details concerning timing considerations and the like have been omitted inasmuch as such details are not necessary to obtain a complete understanding of the present invention and are within the skills of persons of ordinary skill in the relevant art.

IBM's Voice Response for Windows is a powerful, flexible, yet cost-effective voice-processing platform for the Windows NT operating system environment. An equivalent platform is also available for the UNIX environment from the IBM Corporation. Used in conjunction with voice processing hardware, Voice Response can connect to either a PBX or a Public Telephone Network. It is designed to meet the need for a fully automated, versatile, computer telephony system. Voice Response for Windows NT not only helps develop voice applications, but also provides a wealth of facilities to help run and manage them. Voice Response can be expanded into a networked system with centralized system management, and it also provides an open architecture, allowing customization and expansion of the system at both the application and the system level.

In today's business environment, the telephone is often the primary means of communication in many different situations, for example: placing catalog orders; checking airline schedules; querying prices; reviewing account balances; notifying customers of price or schedule changes; and recording and retrieving messages. Usually, each telephone call involves a service representative talking to a caller, asking questions, entering responses into a computer, and reading information to the caller from a terminal screen. Now, this process is automated by substituting a Voice Response voice application for the operator.

A business may rely on providing up-to-date inventory information to retailers across the country, and a Voice Response for Windows NT application can be designed to receive orders from customers and retrieve data they request from a local or host-based database. Voice Response for Windows can then update the database to reflect any inventory activity resulting from calls. Voice Response for Windows accelerates communications between a main office and a marketing force. A sales representative can obtain product release schedules or order product literature anytime, anywhere, simply by using the telephone. A customer can inquire about a stock item, and Voice Response for Windows can determine availability, reserve the stock, and schedule delivery. Voice Response can verify customer charge accounts and check the status of catalog orders.

Figure 1:
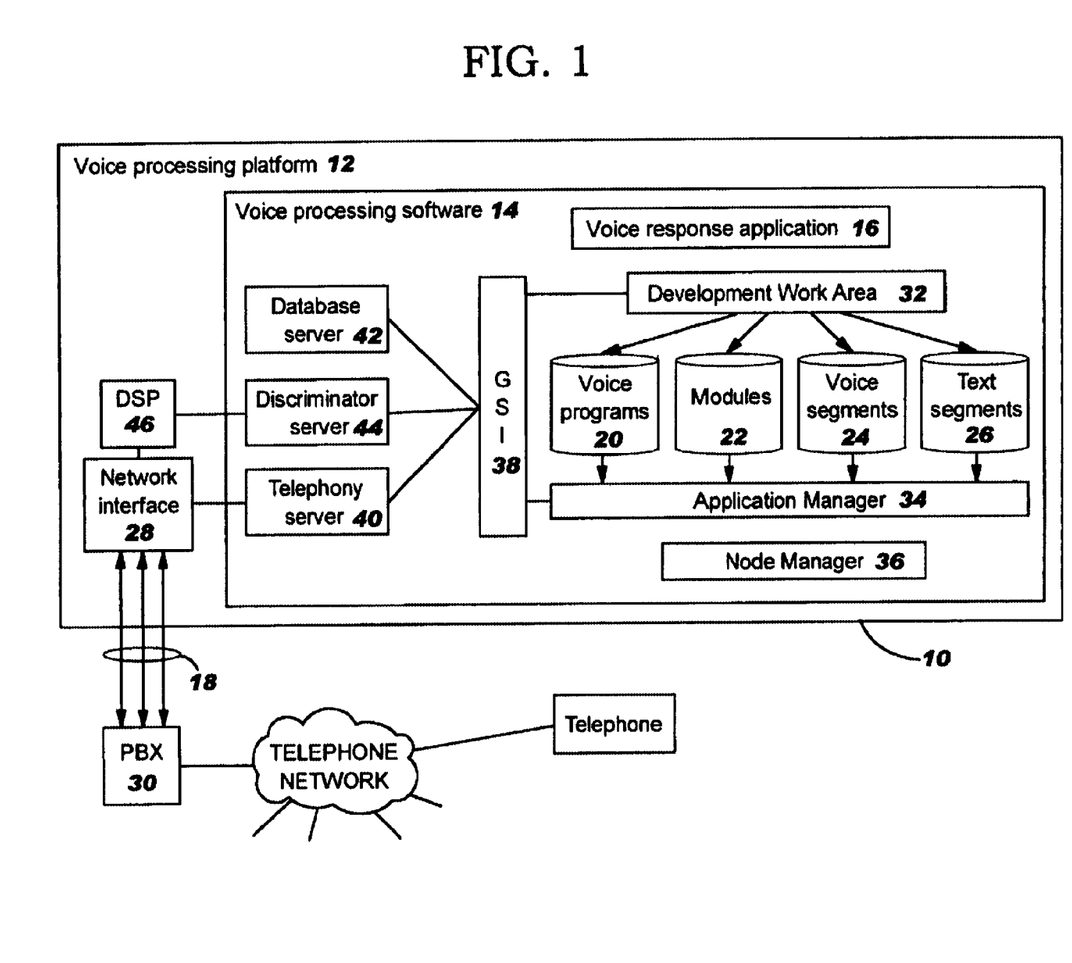
FIG. 1 is a representation of an interactive voice response system of the present invention.

Referring to FIG. 1, voice system 10 of the present embodiment comprises: a voice processing system platform 12 such as IBM Voice Response for Windows; a Voice Response application 16; and telephone lines 18 to connect callers to the voice system. The following hardware and software is used for the basic voice processing system platform 12: a personal computer, with an Industry Standard Architecture (ISA) bus or a Peripheral Component Interconnect (PCI) bus, running Microsoft Windows NT; one or more Dialogic or Aculab network interface cards for connecting the required type and number of telephone lines to Voice Response for Windows; and one or more Dialogic voice processing cards. (For the UNIX environment, the interface and processing resource cards are provided by the IBM Corporation.)

A Voice Response for Windows application 16 includes programmed interaction between the voice system and a caller. Voice applications include one or more voice programs 20 that control the interactions between callers and the various functions of Voice Response. Applications are written in Telephony REXX (T-REXX), which incorporates the power and ease-of-use of IBM REXX programming language. Voice programs also use modules 22 that control the playing of recorded voice segments 24 or synthesized text segments 26.

Voice Response for Windows supports up to 60 E1 or 48 T1 or analog telephone lines 18 on a single personal computer. (In the UNIX environment, up to 360 E1 or 248 T1 digital channels may currently be supported on a single machine.) Voice Response for Windows is connected to telephone lines 18 through standard voice communications cards 28. The telephone lines 18 can come directly from the public telephone network or through a private branch exchange (PBX) 30. If call volumes require (or will grow to require) more than 60 E1 or 48 T1 or analog lines, additional Voice Response for Windows systems can be created and connected together through a LAN (not shown). All systems connected together through a LAN can be managed from a single node.

Within a voice system the function of several different cards, for example voice recognition and text-to-speech may be made, available on each of a number of telephone lines by connecting the cards together with ribbon cables to form a System Computing Bus (SCbus).

The voice processing software 14 includes a number of components, each designed to perform, or to help you to perform, a specific task or tasks related to a voice processing system. A development work area 32 allows creation and modification of a voice-processing application. An application manager 34 runs the application. A node manager 36 allows monitoring of the status of application sessions and telephone lines and allows the issue of commands to start and stop application sessions. A general server interface (GSI) 38 manages all communications between the component programs of Voice Response for Windows. Voice Response components use a set of defined actions to cover most of the common functions required by voice programs to perform voice processing tasks. The components also use a number of APIs to enable creation of customized actions, servers, and clients. The development work area 32 and the node manager 36 are interactive applications, each of which can be started from the Windows Start menu, or the Voice Response folder to interact with callers. The application manager runs the application in a production environment. When the system is configured it must determine how the telephone lines 18 will be used to the specific needs of the business. A Voice Response for Windows system can run up to 60 applications simultaneously. This can range from one application running on all 60 lines to 60 different applications each running on a separate line.

Node manager 36 manages the Voice Response for Windows system. It is used to monitor and alter the current status of voice application sessions or telephone lines 18. The node manager 36 displays real-time status information and accumulated statistics on each path of a network node. For example, one can start or stop an application session, view its log file, enable or disable a telephone line, or check the status of a terminal emulation session.

Voice Response clients are programs that request information or services from other Voice Response for Windows programs. Voice Response servers are the Voice Response for Windows programs that provide services to Voice Response for Windows clients. They require a variety of services, such as playing recorded voice segments or reading a database. The application manager 34 requests these services from the Voice Response for Windows telephony server or database server. The modular structure of Voice Response for Windows and the open architecture of the general server interface (GSI) 38 allows development of clients and servers that are unique to specific applications. A user-defined server can provide a bridge between Voice Response for Windows and another product that has an open architecture. For example, in this embodiment, a language discriminator server is created to analyze incoming telephone callers and estimate the language used.

The voice processing software 14 comprises a telephony server 40 which interfaces with the network interface 28, a database server 42 which provides all the database functionality of the applications, and a language discriminator server 44 which connects to digital signal processor (DSP) 46. DSP 46 provides the frequency analysis required by the embodiment. In operation, the voice application 16 will request the language discriminator server 44 for a language estimate of a caller and will receive a response over the GSI 38. The application 16 can then choose which dialogue path to use and which prompts to play. A decision about which set of language prompts is to be used is made on the output of language discriminator server 44.

Figure 2:
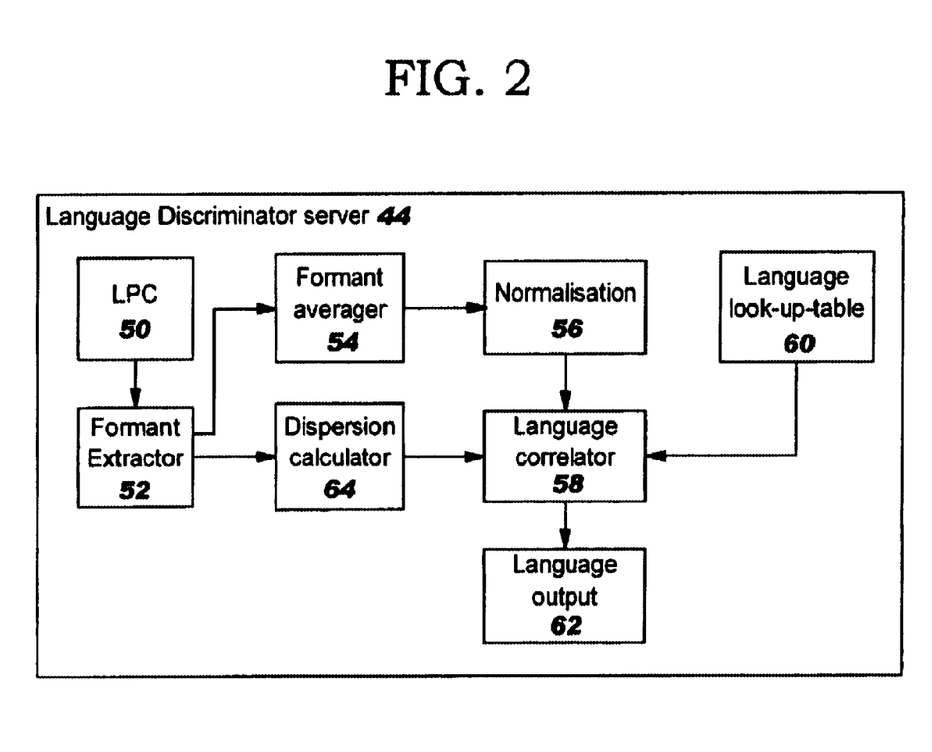
FIG. 2 is a representation of a language discriminator of the present embodiment.

FIG. 2 represents components of language discriminator server 44 of the present embodiment comprising linear predictive coding device (LPC) 50 having output into a format extractor 52. The format extractor 52 provides input for a format averager 54 which provides input for a normalization component 56. A language correlator 58 takes input from the normalization component 56 and from a language look-up-table 60 to provide language output 62. A dispersion calculator 64 also takes input from the format extractor 52 and provides output for the language correlator 58.

Figure 4:
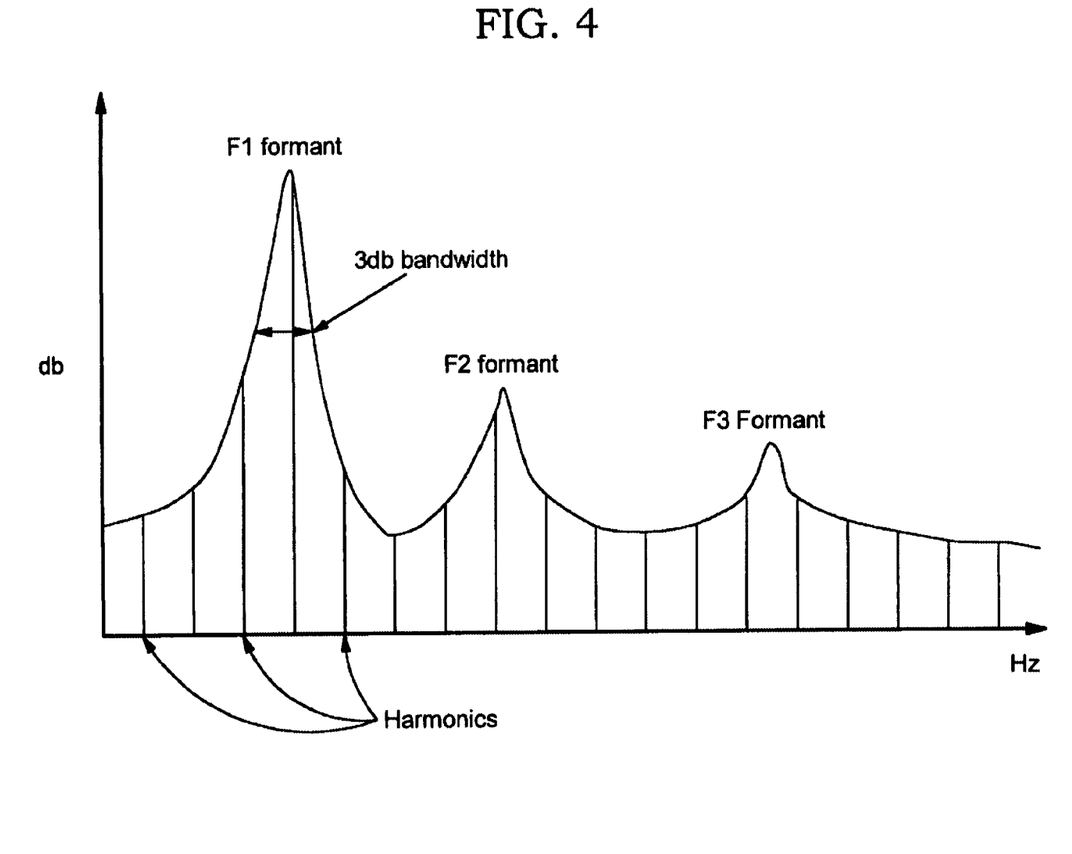
FIG. 4 is a representation of a voice signal frequency spectrum.

The LPC 50 extracts the fundamental frequency (F0) contour and provides the spectral polynomial (see FIG. 4) for the format extractor 52. LPC 50 also provides a bandwidth estimation (-3dB down) for the formants and a short-term spectral analyzer such as based on 256 point Hamming window section of speech from the original signal. Linear predictive coding (LPC) is a well known computational method for estimating format centre frequencies and bandwidths from digitized samples of the time-domain wave form of a vowel. The method depends on the structure of the time-domain wave form of an epoch of speech and on the assumption of complete, mutual independence of source and filter. The waveform of a voiced vowel has a more or less regular structure over any short portion of the vowel's duration. Therefore, the value of a given sample from the waveform can be predicted, albeit with some error, from the values of n of its immediate predecessors. The prediction takes the form of a linear equation with constant coefficients. Implementing LPC then becomes a problem of finding values for the coefficients that minimize the prediction error. Linear prediction is also a method for estimating format centre frequencies and bandwidths. For the order of the analysis the value of n is usually set to between 12 and 16, providing 6 to 8 poles. The analysis window is usually 128, 256 or 512 samples wide. Smaller windows begin to yield unstable results, while larger windows may smear important changes that the prediction coefficients would otherwise undergo. When dealing with natural speech, format parameter values are determined within an analysis window that is shifted forward in time every 50 ms or so. This rate of shifting is fast enough to represent the effects of changes in the positions of articulators. The resulting format centre frequencies and bandwidths then can be treated as functions of time. LPC analysis also can produce a smoothed spectrum representing the action of a filter that includes the effects of source spectrum, vocal-tract resonances, and lip radiation.

Figure 5:
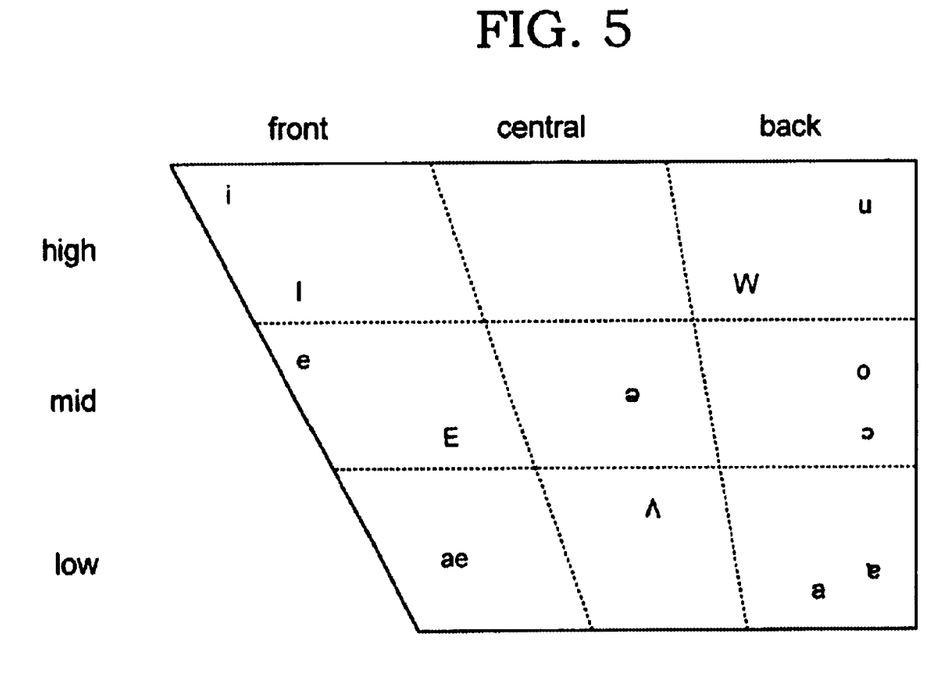
FIGS. 5 and 6 are representations of a voice signal in format space.

The format extractor 52 takes the waveform polynomial from the LPC 50 for each sample and establishes the centre frequencies of two formants F1 and F2 by calculating the maxima of the polynomial. This process can be carried out by known algorithms, for example in Appendix 10 of 'Fundamentals of speech signal processing' by Shuzo Saito and Kazuo Nakata, Academic Press, which is hereby incorporated by reference herein. F2 may be the physical format (the second major resonance of the vocal tract) or F2', being a weighted average of F2, F3 and F4. Format theory as applied to voice signals is explained in greater detail in "Vowel Perception & Production", B. S. Rosner and J. B. Pickering, Oxford University Press, which is hereby incorporated by reference herein. Phoneticians have traditionally used a two-dimensional graph, the vowel quadrilateral, to display key features of vowel production (see FIG. 5). FIG. 5 shows a variant on the quadrilateral that Daniel Jones suggested (see Jones, "An outline of English phonetics", 1960, W. Heffer & Sons, Cambridge). The horizontal dimension of the chart represents tongue advancement, while the vertical dimension indicates tongue height. The boundaries of the chart are taken directly from Jones's representation. The corners and the points of intersection of the boundary with the horizontal lines define eight of his cardinal vowels. The symbols in FIG. 5 give the articulatory positions for various British English vowels. The vowel chart suggested by Jones was later carried over as a way of representing vowels acoustically in a two-dimensional space. For each vowel, the centre frequencies F1 and F2 are determined for the first two formants. To represent a vowel in the acoustic plane, the frequency values of F1 and F2 are obtained at the 'middle' of the vowel, from LPC. In the simplest form of the acoustic plane, the values for F2 are then plotted against those for F1. The origin of the plane is placed in the right-hand upper corner. The F1 axis becomes vertical, and the F2 axis becomes horizontal. The F2/F1 chart can be read in either of two isomorphic ways: as a representation of format centre frequencies or as a representation of peak frequencies in the spectral envelope of the radiated acoustic signal at the lips.

Figure 6:
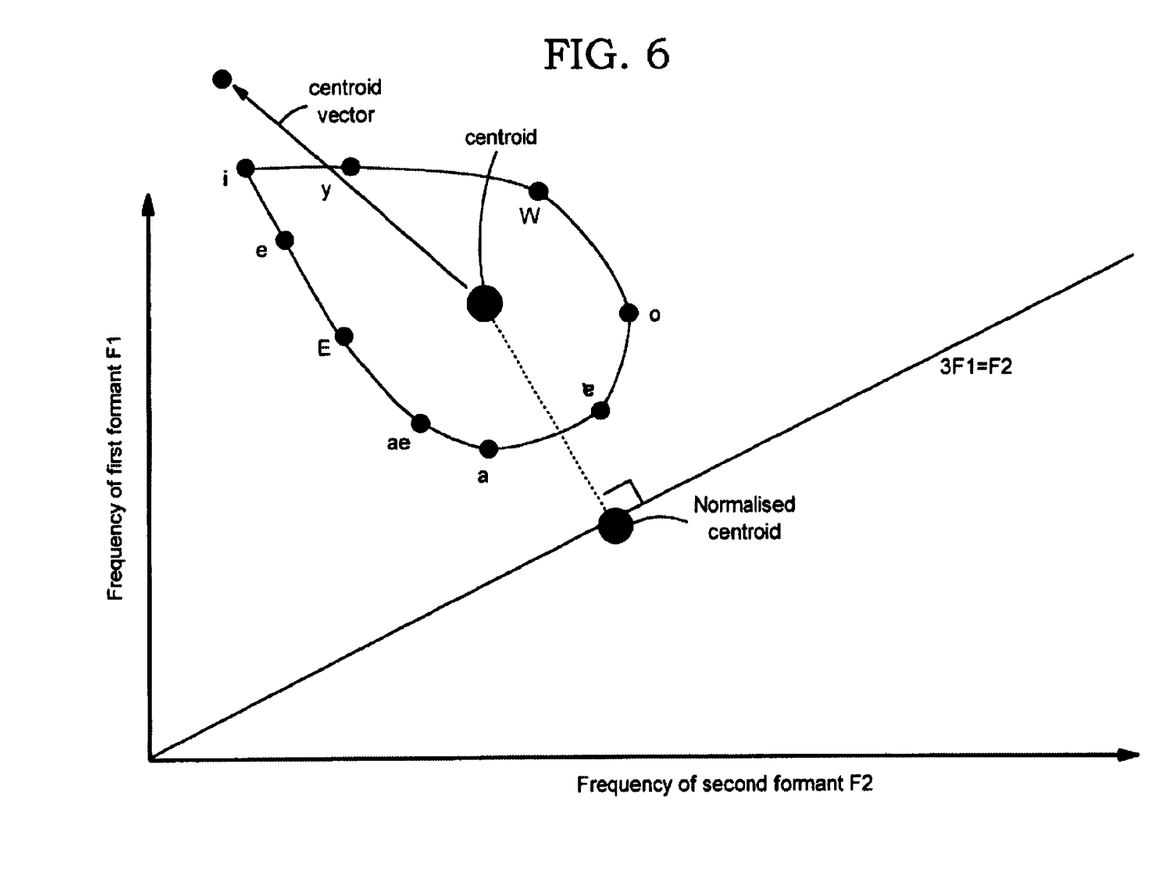

FIG. 6 shows a set of vowels plotted in the F2/F1 acoustic plane. This part of the figure contains points for sustained unrounded and rounded vowels spoken by a native speaker of a language such as English. In some acoustic charts, the origin of the plane is placed in the usual lower left-hand position, making F1 and F2 axes horizontal and vertical respectively. The F2/F1 plane gives a convenient way of representing a given vowel system and of depicting differences in vowel systems between languages or dialects. Each member of a vowel system assumes a specific position in the F2/F1 plot. The points in the plot form a particular configuration. The vowels of different languages generate different configurations in the F2/F1 plane. Languages with few vowels have only a few points on the plane. Languages with many vowels yield numerous points. Two languages that seem to share a vowel produce points that coincide with or are close to one another.

Referring again to FIG. 2, the format averager 54 takes each individual value of F1 and F2 from Extractor 52 and calculates the centroid (see solid circle in FIG. 6) being the running average of F1 and F2 (or F2') from the onset to the end of the signal (or to the current location), this calculation should only be done for fully voiced speech which corresponds to values of the fundamental F0 with a normal range.

The dispersion calculator 64 takes each individual value for F1 and F2 and calculates the average excursion from the centroid calculated by format average 54, i.e. for each 256 point spectral section of fully voiced speech. (See solid arrow in FIG. 6.) Using basic acoustic theory and approximating the vocal tracts to a closed tube, it is possible to predict for any loss-less system, the expected format frequencies, and therefore the centroid and average excursion. For instance, for a 17.5 cm vocal tract and a set of quasi-Cardinal vowels, 3F1=F2 where F1=500 Hz and F3=1500 Hz. This predicted centroid is the nominal centroid and the predicted excursion, the nominal excursion.

The normalizer 56 takes the centroid (F1 and F2) for this speech sample calculated by the format extractor and calculates the nearest point on the line of the nominal predicted centroid (3F1=F2). This shift is only to take the centroid towards the nominal predicted centroid and F1 and F2 for the normalized centroid should retain the same ratio as before normalization. The nominal prediction yields a 3:1 ratio on a linear Hertz scale. A useful normalized output is a measure of how far the centroid is from the theoretical ratio, that is the ratio of the specific formats F2/F1 minus 3. Another useful value is the ratio of the specific average formats to the theoretical average formats F2(specific average)/F2(theoretical average) and F1 (specific average)/F1(theoretical average).

The language correlator 58 considers two factors: the distance vector between the actual centroid and the nominal centroid, and the difference between the nominal average excursion and the real average excursion. The centroid value is the more important in distinguishing language and may be used alone for approximate estimates. A better estimate is one in which the centroid excursion is taken into account.

Figure 3:
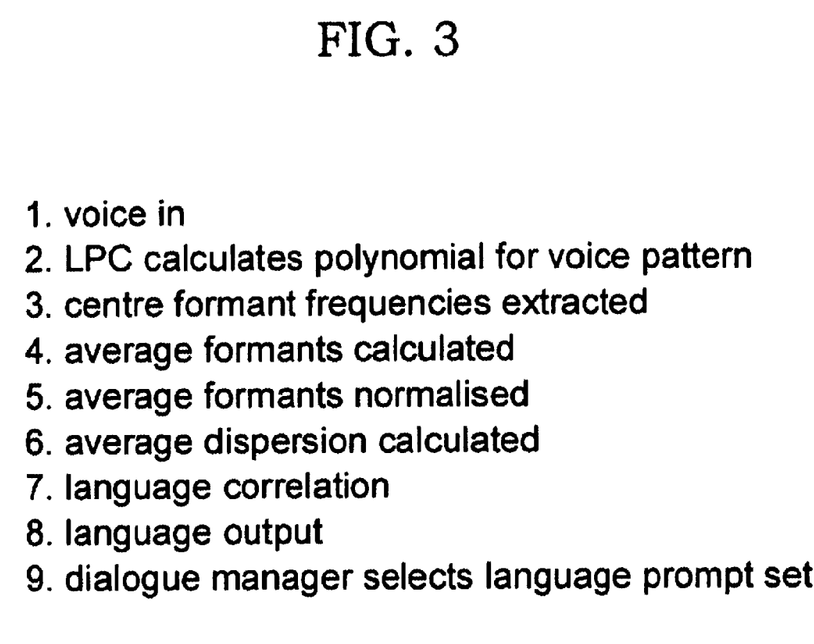
FIG. 3 is a representation of a method of the present embodiment.

FIG. 3 represents a simplified method step diagram of the present embodiment. A caller dials into the IVR and a voice signal is input into the language discriminator 44 (step 1). The LPC 50 samples the voice signal and calculates polynomial representing the waveform (step 2). The format extractor 52 takes the polynomial (see FIG. 3) and calculates the maxima points and the first and second formants (step 3). The format averager 54 takes the F1 and F2 values for each sample and averages for all the samples to calculate the centroid value (step 4) (also see FIG. 5). The centroid value is normalized with respect to a reference value (3F1=F2). The average dispersion is calculated by averaging each absolute displacement from the centroid for all the samples (step 6). The language correlator 58 takes input from the normalized centroid and the average dispersion and does a best match with reference values held in the language look-up-table 60 (step 7). The best match language indicated by the best match reference values is output to the dialogue manager (step 8). The dialogue manager selects a relevant prompt set on the basis of best match language (step 9).

For example, an English speaker would be expected to have a normalized F2/F1 value of approximately 3. Whereas a French speaker would be less than this. A British English speaker would have an approximate dispersion value of 6.5 and a U.S. English speaker would be less than this with approximately 5.5.

In another embodiment, a further method for the extraction of fine temporal organization within the audio signal is used on its own for broad language type categorization or in combination with the methods described above to allow fine tuning of the language-type categorization. The audio signal is analyzed using standard linear predictive coding (LPC) techniques to estimate the fundamental frequency contour (module A). Based on this, where F0 values fall close to zero, the crude crossover point(s) of voiced to voiceless speech and vice versa are marked. From these crossover instances, spectral sections are taken for the next 250 msec forward (in 50 msec steps for example) and back to the previous crossover point (or the beginning of the signal whichever is the closer). Within each of these spectral sections, a measure of the voiced-voiceless content is calculated (using a technique such as spectral tilt estimation). Over the analysis period, the rate of change from 'fully voiceless' to 'fully voiced' or vice versa is calculated, based on the previous voiced-voiceless content scores; in addition, the time taken to reach full voicing (or full devoicing) is stored. The output of this stage, therefore, is the rate of change for voice on- or offset, and the duration of that change: (rate, duration). A variation of this method concentrates on nasalization and is based on the occurrence of spectral zeroes and bandwidth characteristics in the spectral sections. The input here is the format and bandwidth estimation, rather than the F0 contour. The output is similarly the rate of change from fully nasalized to non-nasalized and the duration of that change: (rate, duration). The duration in either case could be absolute but would better be measured in relative terms as a percentage of the overall average duration of fully voiced speech.

A further method which is used in combination with the method of the first embodiment calculates a factor representing the duration of the voicing of changing in the F0 contour. The F0 contour is smoothed to establish its basic contour (simple fall, simple rise; fall-rise, rise-fall; rise-fall, rise-fall-rise—or SIMPLE, MEDIUM and COMPLEX respectively). For any MEDIUM and COMPLEX F0 excursions, the average duration across the speech signal is calculated. This factor is compared with reference factors for known languages as described above. A variation of this additional embodiment may be used during voiceless periods (such as fricatives or stop bursts) to estimate the high format bandwidths.

The above methods provide a number of quantitative factors derived from the speech signal with which to distinguish the nationality of the speaker. Although described individually, a further embodiment uses two or more factors together to generate a multi-dimensional representation of the speech signal. All of these would be used in a self-organizing system as the inputs to map features extracted from the audio signal to a language. A neural network, for example, would be trained to map values determined by these methods from processing the audio signal to the set of known languages. Alternatively, a statistical model such as a Markov Model could be employed to find the best fit of the factors to a language.

What is claimed is:

1. A method of determining a language set for use in an interactive voice response system comprising the steps of:
   providing a plurality of samples from a voice signal;
   calculating a non-phonetic characteristic of each sample; and
   selecting a corresponding language set based on the non-phonetic characteristic,
   wherein the non-phonetic characteristic is based on an average first and second format frequency for each sample, and
   further comprising a step of calculating a first factor based on the average displacement of each sample from the averaged first and second format frequency and calculating a second factor based on the average displacement of the samples, the nearest matching reference is compared against the first and second factors.

2. The method as in claim 1 wherein the formats are normalized to 3F1=F2.

3. The method as in claim 2 wherein the second format frequency is a weighted combination of the second and further format frequencies.

4. The method as in claim 3 wherein the first and second formats are only acquired for fully voiced samples where the fundamental frequency is not substantially zero.

5. An interactive voice response (IVR) system for determining a language set comprising:
- circuitry for providing a plurality of samples from a voice signal;
- circuitry for calculating a non-phonetic characteristic from the sample; and
- circuitry for selecting a language set based on the non-phonetic characteristic,
- circuitry for calculating a non-phonetic characteristic based on an average first and second format frequency for the plurality of samples, and
- circuitry for calculating a first factor based on the average displacement of each sample from the averaged first and second format frequency and means for calculating a second non-phonetic characteristic factor based on the average displacement of the samples wherein the nearest matching reference is compared against the first and second factors.

6. The IVR system as in claim 5 further comprising circuitry for normalizing the average formats to 3F1=F2.

7. The IVR system as in claim 5 wherein the second format frequency is a weighted combination of the second and further format frequencies.

8. The IVR system as in claim 5 wherein the first and second formats are only acquired for fully voiced samples where the fundamental frequency is not substantially zero.

9. A computer program product adaptable for storage on a computer readable means, having a set of program instructions operable for determining a language set for use in an interactive voice response system, comprising the steps of:
- providing a plurality of samples from a voice signal;
- calculating a non-phonetic characteristic of each sample; and
- selecting a corresponding language set based on the non-phonetic characteristic,
- wherein the non-phonetic characteristic is based on an average first and second format frequency for each sample, and further comprising a step of calculating a first factor based on the average displacement of each sample from the averaged first and second format frequency and calculating a second factor based on the average displacement of the samples, the nearest matching reference is compared against the first and second factors.

10. The method as in claim 9 wherein the formats are normalized to 3F1=F2.

11. The method as in claim 10 wherein the second format frequency is a weighted combination of the second and further format frequencies, wherein the first and second formats are only acquired for fully voiced samples where the fundamental frequency is not substantially zero.

\* \* \* \* \*